United States Patent
Chun

(10) Patent No.: US 10,217,367 B2
(45) Date of Patent: Feb. 26, 2019

(54) UNMANNED AERIAL VEHICLE AND SYSTEM HAVING THE SAME

(71) Applicant: HYUNDAI MOTOR COMPANY, Seoul (KR)

(72) Inventor: Chang Woo Chun, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/585,656

(22) Filed: May 3, 2017

(65) Prior Publication Data
US 2018/0165973 A1 Jun. 14, 2018

(30) Foreign Application Priority Data
Dec. 14, 2016 (KR) .................. 10-2016-0170187

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G08G 5/00 | (2006.01) |
| B64C 39/02 | (2006.01) |
| G05D 1/06 | (2006.01) |
| G05D 1/10 | (2006.01) |
| G08G 5/02 | (2006.01) |

(52) U.S. Cl.
CPC ......... *G08G 5/0013* (2013.01); *B64C 39/024* (2013.01); *G05D 1/0005* (2013.01); *G05D 1/0669* (2013.01); *G05D 1/0684* (2013.01); *G05D 1/102* (2013.01); *G08G 5/0034* (2013.01); *G08G 5/0069* (2013.01); *G08G 5/025* (2013.01); *B64C 2201/088* (2013.01); *B64C 2201/108* (2013.01); *B64C 2201/128* (2013.01); *B64C 2201/141* (2013.01); *B64C 2201/165* (2013.01); *B64C 2201/18* (2013.01); *B64C 2201/208* (2013.01); *G05D 1/0653* (2013.01)

(58) Field of Classification Search
CPC .. G08G 5/0013; G08G 5/0069; B64C 39/024; G05D 1/0005
USPC .......................................................... 701/3
See application file for complete search history.

(56) References Cited

U.S. PATENT DOCUMENTS

| | | | |
|---|---|---|---|
| 9,056,676 B1* | 6/2015 | Wang | B64F 1/00 |
| 2015/0142221 A1* | 5/2015 | Coulmeau | G01C 21/00 |
| | | | 701/3 |
| 2016/0257401 A1* | 9/2016 | Buchmueller | B64C 39/024 |

* cited by examiner

*Primary Examiner* — Mahmoud S Ismail
(74) *Attorney, Agent, or Firm* — Brinks Gilson & Lione

(57) ABSTRACT

The present disclosure provides a system including: a control center configured to monitor a movement of an unmanned aerial vehicle through a communication with the unmanned aerial vehicle; and the unmanned aerial vehicle configured to transmit and receive information regarding a movement through the communication with the control center, and configured to land on a vehicle moving in a route corresponding to a driving route of a plurality of driving routes of the unmanned aerial vehicle and move together with the vehicle.

18 Claims, 8 Drawing Sheets

UNMANNED AERIAL VEHICLE AND SYSTEM HAVING THE SAME

CROSS-REFERENCE TO RELATED APPLICATION

The present application claims priority to and the benefit of Korean Patent Application No. 10-2016-0170187, filed on Dec. 14, 2016, which is incorporated herein by reference in its entirety.

FIELD

The present disclosure relates to an unmanned aerial vehicle and a system having the same.

BACKGROUND

The statements in this section merely provide background information related to the present disclosure and may not constitute prior art.

An unmanned aerial vehicle capable of flying and recording an image has been developed and supplied. In general, an unmanned aerial vehicle that can fly and be controlled by the induction of radio waves, and provided with the rotary wing is referred to as a drone.

Drones are being used in various fields such as performing a variety of functions, e.g., high altitude recording and delivery. However, as for the drones, the flight distance is limited due to the limited capacity of their batteries, and the fly zone is also restricted by flight regulations.

SUMMARY

The present disclosure provides an unmanned aerial vehicle capable of landing on a vehicle having a similar driving route, in flight, and moving together with the vehicle, and a system having the same.

In some aspects of the present disclosure, a system includes: a control center configured to monitor a movement of an unmanned aerial vehicle through a communication with the unmanned aerial vehicle; and an unmanned aerial vehicle configured to transmit and receive information related to a movement through the communication with the control center, and configured to land on a vehicle moving in a route corresponding to at least one part of a driving route and move together with the vehicle.

The control center is configured to determine a vehicle on which the unmanned aerial vehicle is to land, based on the driving route of the unmanned aerial vehicle, and transmit identification information of the determined vehicle to the unmanned aerial vehicle.

The unmanned aerial vehicle is configured to identify a vehicle that is determined as a landing target vehicle by the control center, and lands on the identified vehicle.

The unmanned aerial vehicle is configured to search vehicles around the driving route of the unmanned aerial vehicle, to identify a vehicle having a disclosed driving route, and to land on a vehicle moving in a route corresponding to at least one part of the driving route of the unmanned aerial vehicle, among the vehicles having the disclosed driving route.

The unmanned aerial vehicle is configured to determine a landing position and land on a vehicle moving in a route corresponding to at least one part of the driving route of the unmanned aerial vehicle, among vehicles around the determined landing position.

The unmanned aerial vehicle is configured to take off from the vehicle when a remaining distance to a destination is equal to or less than a predetermined distance.

The unmanned aerial vehicle is configured to periodically re-search a driving route while landing on the vehicle and moving with the vehicle, and when the vehicle deviates from the driving route, the unmanned aerial vehicle is configured to take off from the vehicle.

The control center is configured to periodically monitor whether the vehicle deviates from the driving route when the unmanned aerial vehicle lands on the vehicle and moves together with the vehicle, and when the vehicle deviates from the driving route, the control center is configured to re-search a driving route of the unmanned aerial vehicle and transmit the searched driving route to the unmanned aerial vehicle.

The control center is configured to transmit flight information including coordinates of the destination and GPS coordinates and altitude information generated every predetermined distance, to the unmanned aerial vehicle.

When a predetermined condition occurs, the unmanned aerial vehicle is configured to transmit information related to the condition to the control center, and when receiving information related to a waiting area from the control center, the unmanned aerial vehicle is configured to move to the waiting area and wait.

When receiving information related to the predetermined condition from the unmanned aerial vehicle, the control center is configured to search a waiting area to which the unmanned aerial vehicle is to be moved, to transmit the information related to the waiting area to the unmanned aerial vehicle, and to send a rescue unmanned aerial vehicle to the waiting area.

In some aspects of the present disclosure, an unmanned aerial vehicle includes: a sensor configured to acquire information related to the surroundings; a communicator configured to communicate with a control center; and a controller configured to allow an unmanned aerial vehicle to land on a vehicle moving in a route corresponding to at least one part of a driving route, based on information acquired by the sensor and information that is transmitted from the control center and received via the communicator.

When the communicator receives identification information of a landing target vehicle that is transmitted from the control center, the controller is configured to identify the landing target vehicle based on the information acquired by the sensor, and to allow the unmanned aerial vehicle to land on the landing target vehicle.

The controller is configured to identify a vehicle having a disclosed driving route among vehicles around the driving route of the unmanned aerial vehicle based on the information acquired by the sensor, and to allow the unmanned aerial vehicle to land on a vehicle moving in a route corresponding to at least one part of the driving route of the unmanned aerial vehicle, among the vehicles having the disclosed driving route.

The controller is configured to determine a landing position and allow the unmanned aerial vehicle to land on a vehicle moving in a route corresponding to at least one part of the driving route of the unmanned aerial vehicle, among vehicles around the determined landing position.

The controller is configured to allow the unmanned aerial vehicle to take off from the vehicle when a remaining distance to a destination is equal to or less than a predetermined distance.

The controller is configured to periodically re-search a driving route while the unmanned aerial vehicle lands on the vehicle and moves with the vehicle, and when the vehicle deviates from the driving route, the controller is configured to allow the unmanned aerial vehicle to take off from the vehicle.

When a predetermined condition occurs, the controller is configured to transmit information related to the condition to the control center and when receiving information related to a waiting area, the controller is configured to move the unmanned aerial vehicle to the waiting area, at which the unmanned aerial vehicle waits.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
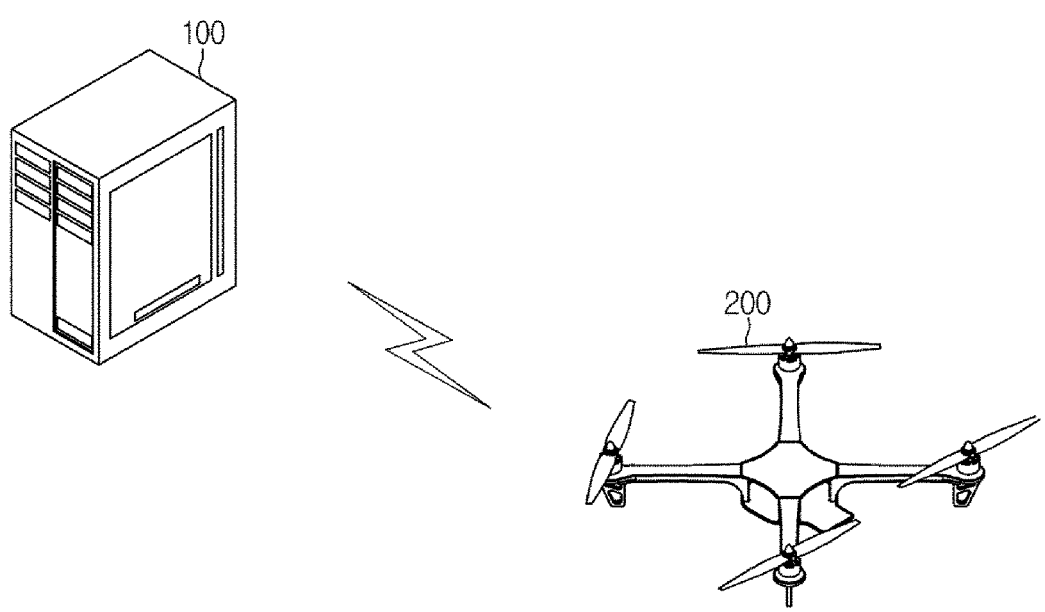
FIG. 1 is a view illustrating a system having an unmanned aerial vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
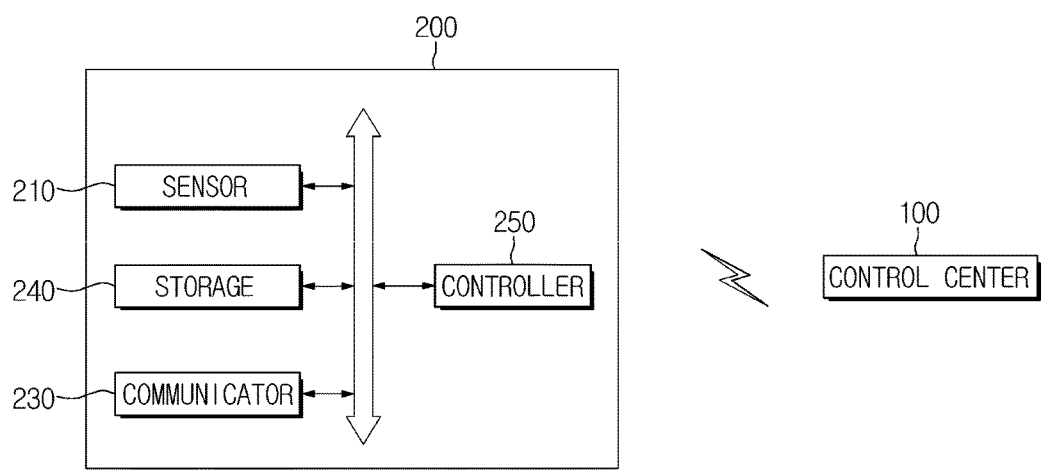
FIG. 2 is a view illustrating a configuration of the unmanned aerial vehicle.
Figure 3:
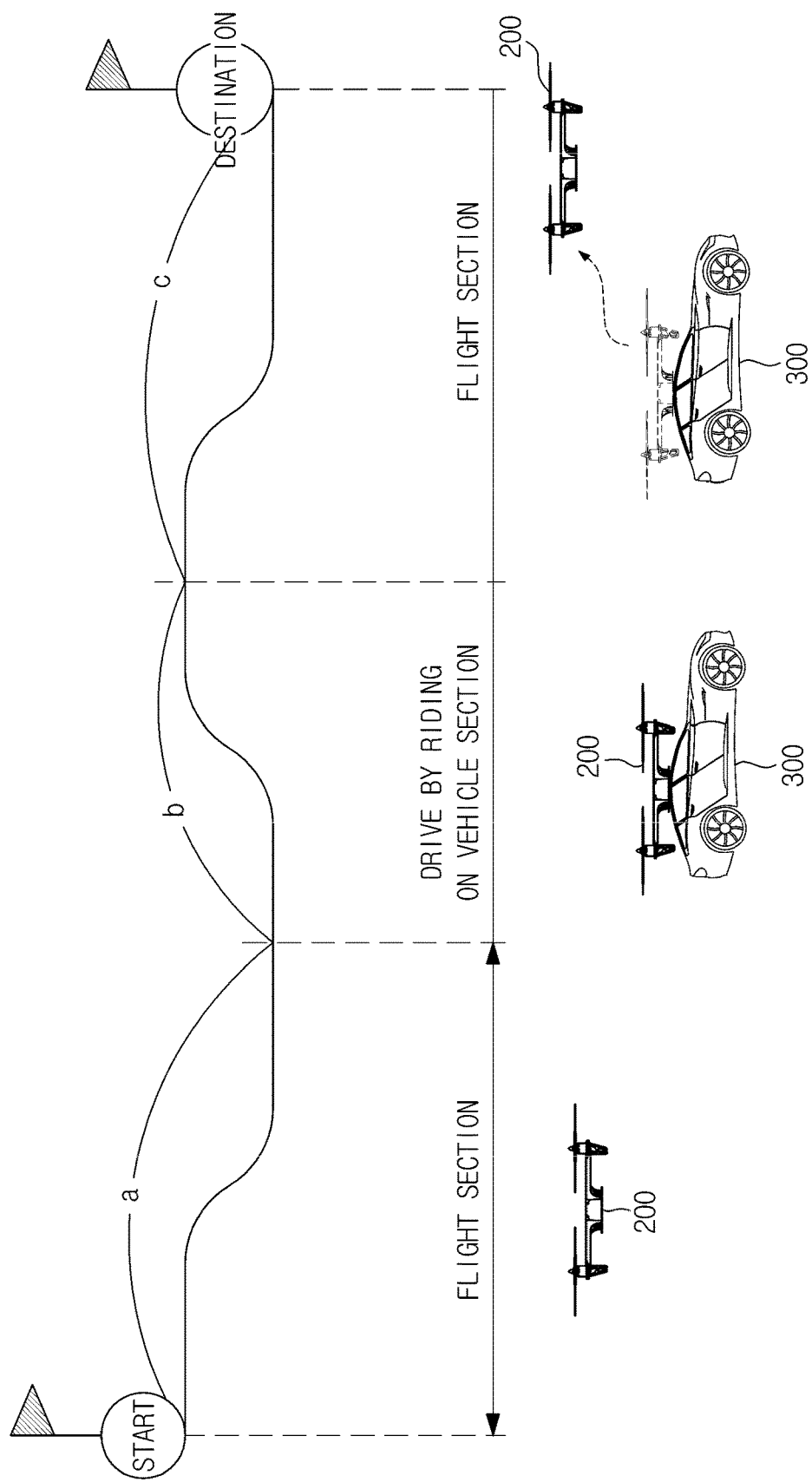
FIG. 3 is a view schematically illustrating a movement of the unmanned aerial vehicle by riding on a vehicle.

FIG. 1 is a view illustrating a system having an unmanned aerial vehicle in some forms of the present disclosure, and FIG. 2 is a view illustrating a configuration of the unmanned aerial vehicle in some forms of the present disclosure. FIG. 3 is a view schematically illustrating a movement of the unmanned aerial vehicle by riding on a vehicle in some forms of the present disclosure.

As illustrated in FIG. 1, in some forms of the present disclosure, a system may include a control center 100 configured to monitor a movement of an unmanned aerial vehicle 200, and the unmanned aerial vehicle 200.

In some forms of the present disclosure, the unmanned aerial vehicle 200 may include a storage 240, a communicator 230 configured to communicate with the control center 100, another unmanned aerial vehicle 200 and a vehicle, a sensor 210 configured to obtain information related to the surroundings and flight conditions of the unmanned aerial vehicle 200 and a controller 250 configured to control riding on the vehicle.

The communicator 230 may include a communication module configured to communicate with the control center 100, and the communication module may include one or more components. For example, the communication module may include a wireless communication module, and additionally include at least one of a short range communication module and a wired communication module.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface provided with a communication port connecting the network to the controller 250, a transmitter transmitting information related to the conditions and flight conditions of the unmanned aerial vehicle 200 and a receiver receiving information from the control center 100, the another unmanned aerial vehicle 200, or the vehicle. The wireless communication module may further include a signal conversion module configured to modulate a digital control signal output from the controller 250 via the wireless communication interface under the control of the controller 250, into a radio signal in the analog form, and configured to demodulate the radio signal in the analog form, which is received via the wireless communication interface, into a digital control signal.

The controller 250 may be implemented using a memory storing an algorithm and program type data to control an operation of each component of the communicator 230 and a processor performing the above mentioned operation using the data stored in the memory. The memory and the processor may be implemented in separate chips, or a single chip. The controller 250 may be provided on the outside of the communicator 230 and configured to control the overall configuration of the unmanned aerial vehicle 200. The controller 250 may be included in the communicator 230.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), and Digital Visual Interface (DVI).

The communicator 230 may receive GPS signals from at least three GPS satellites and calculate a current position of the unmanned aerial vehicle 200 based on the GPS signals and map data. In a state in which a path from the current position of the unmanned aerial vehicle 200 to a destination is set, the communicator 230 may transmit information related to the current position of the unmanned aerial vehicle 200 on the map to the control center 100. The communicator 230 may transmit information acquired by the sensor 210, e.g., images acquired by an image sensor, information about the surrounding condition and the flight information of the unmanned aerial vehicle 200 detected by other sensors, to the control center 100. As mentioned above, the communicator 230 may transmit a variety of data related to the unmanned aerial vehicle 200 to the control center 100.

The storage 240 may be a storage included in the communicator 230 or included in the unmanned aerial vehicle 200 instead of being included in the communicator 230. The storage 240 may be an external memory that is not included in the unmanned aerial vehicle 200. The storage 240 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage 240 is not limited thereto. The storage 240 may be a memory that is implemented by a separate memory chip from the aforementioned processor or the storage 240 may be implemented by a processor and a single chip. The storage 240 may pre-store data that is required for the flight, e.g., map information and road information.

The sensor 210 of the unmanned aerial vehicle 200 may include a variety of sensors configured to detect the surroundings of the unmanned aerial vehicle 200 and the states of the unmanned aerial vehicle 200, and configured to acquire information related to the movement of the unmanned aerial vehicle 200. The sensor of the unmanned aerial vehicle 200 may include various types of sensors such as an image sensor, a radar sensor, an ultrasonic sensor, a gyro sensor, an acceleration sensor, an angular speed sensor or a GPS sensor.

The unmanned aerial vehicle 200 may include means for the flight. For example, the unmanned aerial vehicle 200 may be implemented in the form of multi-copters, e.g., dual-copters, tri-copters, quad-copters or octo-copters, to perform a vertical taking off and landing, and flight by having a rotary wing. In the unmanned aerial vehicle 200, means for the flight is not limited to the above-described rotary wing, and thus the means may include well-known various means.

The controller 250 may control the overall operation related to the movement of the unmanned aerial vehicle 200, e.g., flying, taking off and landing of the unmanned aerial vehicle 200, by controlling the flight means such as the rotary wing.

The control center 100 may monitor the movement of the above described unmanned aerial vehicle 200 to control the movement of the unmanned aerial vehicle 200. The control center 100 may transmit a destination and at least one flight route to reach the destination, to the unmanned aerial vehicle 200. The control center 100 may calculate a flight route in which the unmanned aerial vehicle 200 flies using the map and the road information. The flight route transmitted by the control center 100 may include flight information assigned to each predetermined unit of distance. The flight route may include GPS coordinates and altitude information generated at every 5 meters.

The unmanned aerial vehicle 200 may receive the flight route information transmitted from the control center 100, and fly according to the received fight path. Alternatively, the unmanned aerial vehicle 200 may search a flight route by itself and fly according to the searched flight route.

In the flight or movement, the unmanned aerial vehicle 200 may transmit the information related to the flight or movement and information related to the state of the unmanned aerial vehicle 200, to the control center 100 in real time. The unmanned aerial vehicle 200 may receive the real-time updated information related to the flight or the movement, from the control center 100.

As illustrated in FIG. 3, in some forms of the present disclosure, in order to reach the destination, the unmanned aerial vehicle 200 may move in a certain route (a and c) by flying or move together with the vehicle 300 by landing on the vehicle 300 in a certain route (b) among the flight route that is received from the control center 100 or calculated by the unmanned aerial vehicle 200. As illustrated in FIG. 3, in order to reach the destination, the unmanned aerial vehicle 200 may fly in "a" section, move in "b" section by determining a landing target vehicle 300 and in a state of landing on the vehicle 300, and fly again in "c" section after taking off the vehicle 300.

For the movement by riding on the vehicle 300, the unmanned aerial vehicle 200 may move together with the vehicle 300 by landing on the roof of the vehicle 300 that moves in a direction corresponding to a direction of the destination, on the road corresponding to a certain route among the flight route.

Figure 4:
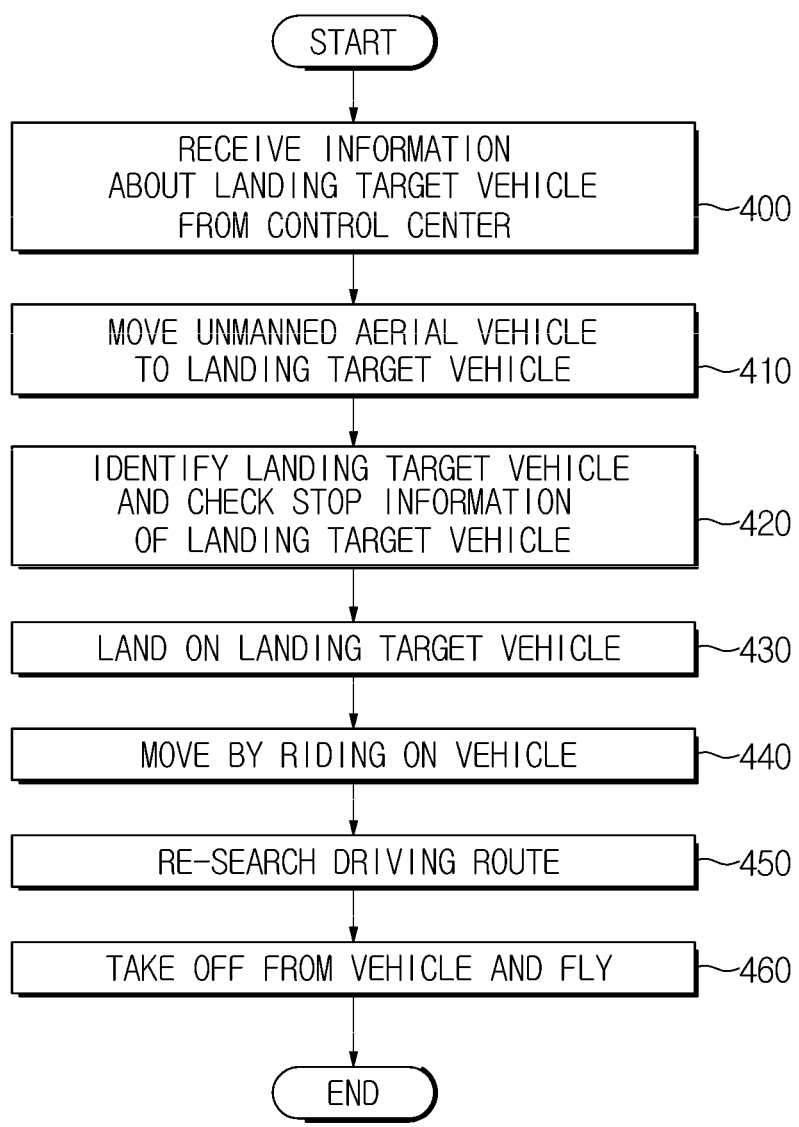
FIGS. 4 to 8 are a flowchart illustrating a movement method of the unmanned aerial vehicle by riding on the vehicle.
Figure 5:
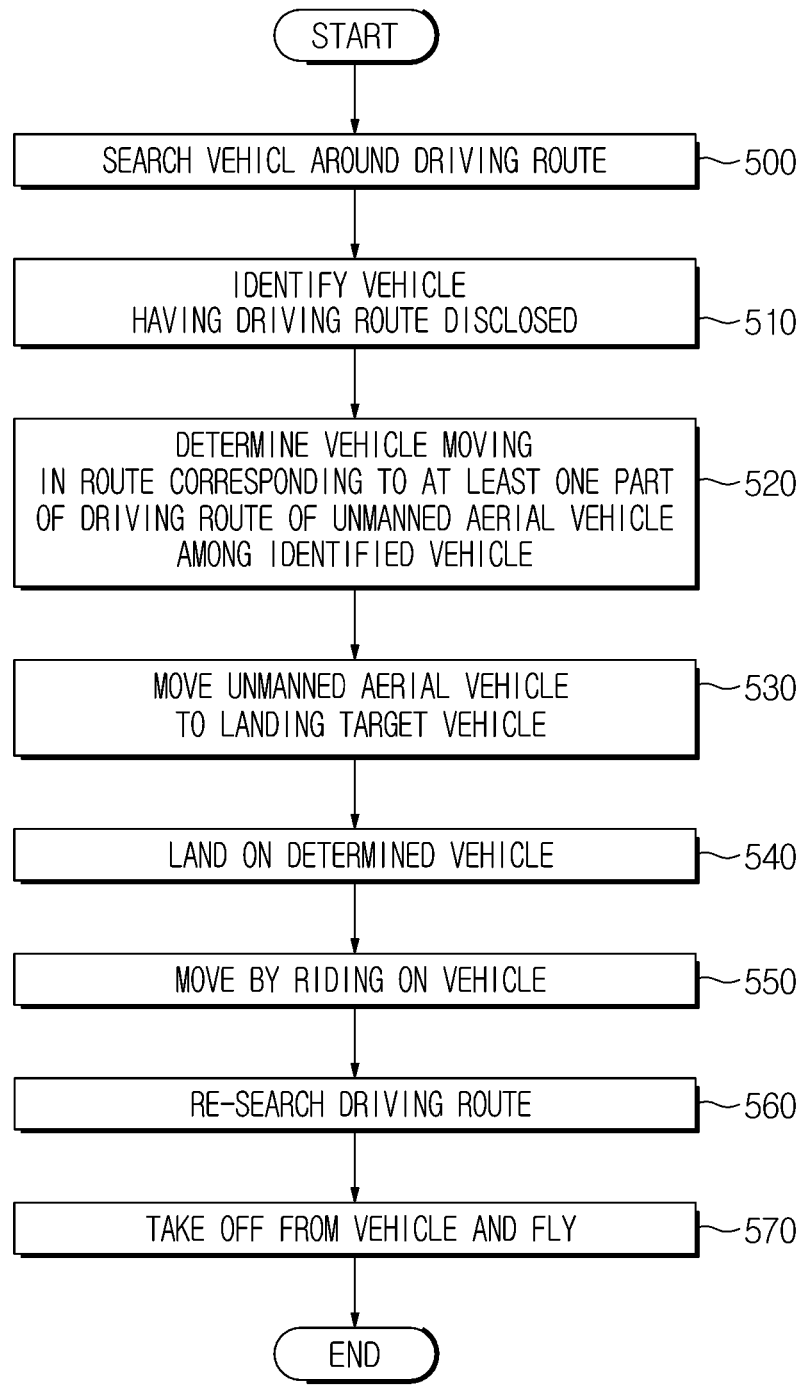
Figure 6:
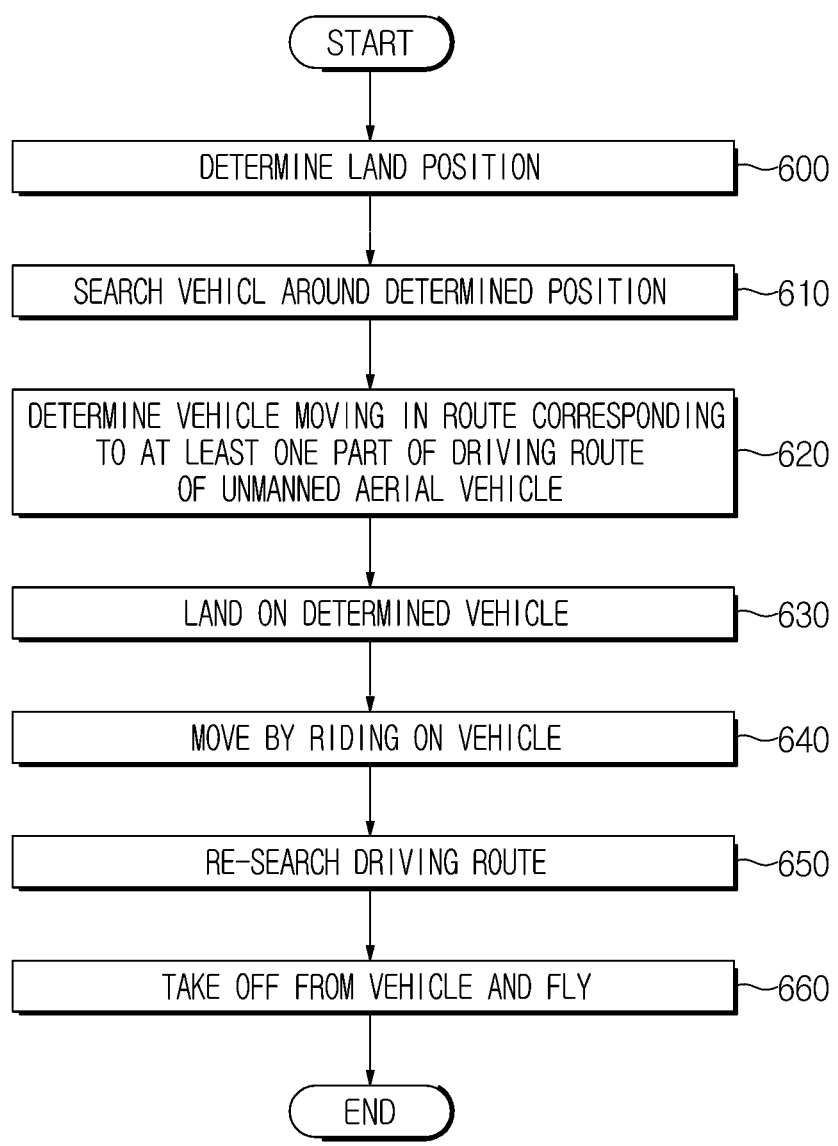

A procedure for determining the vehicle 300 on which the unmanned aerial vehicle 200 is to land will be described with reference to FIGS. 4 to 6.

In some forms of the present disclosure, the unmanned aerial vehicle 200 may move by landing on the vehicle 300 that is assigned by the control center 100. Referring to FIG. 4, when the unmanned aerial vehicle 200 receives information related to the landing target vehicle 300 from the control center 100 (400), the unmanned aerial vehicle 200 may move to the landing target vehicle 300 (410), identify the landing target vehicle 300, check stop information of the landing target vehicle 300 (420), and land on the landing target vehicle 300 (430).

The control center 100 may determine a vehicle 300 that is appropriate for the unmanned aerial vehicle 200 to land and move together with, based on the flight route of the unmanned aerial vehicle 200. The control center 100 may determine a vehicle 300 that moves in the same route as or similar route with a certain route in the flight route, as the landing target vehicle 300. The control center 100 may transmit the real-time position, the driving route, and the vehicle identification information of the landing target vehicle 300 to the unmanned aerial vehicle 200.

When the unmanned aerial vehicle 200 receives the information of the landing target vehicle 300 from the control center 100, the unmanned aerial vehicle 200 may move to the position of the landing target vehicle 300 and identify the landing target vehicle 300 by comparing the information received from the control center 100 with the identification information of the landing target vehicle 300 acquired by the sensor 210 of the unmanned aerial vehicle 200. When the unmanned aerial vehicle 200 fails to identify the landing target vehicle 300 and thus the unmanned aerial vehicle 200 cannot determine the landing target vehicle 300, the unmanned aerial vehicle 200 may determine the landing target vehicle 300 by performing a Machine to Machine (M2M) communication with the landing target vehicle 300.

That is, when the unmanned aerial vehicle 200 cannot determine the landing target vehicle 300, the vehicle 300 designated by the control center 100 may transmit the M2M communication information to the control center 100 and the control center 100 may transmit the M2M communication information of the landing target vehicle 300 to the unmanned aerial vehicle 200. When the unmanned aerial vehicle 200 receives the M2M communication information, the unmanned aerial vehicle 200 may determine the landing target vehicle 300 via the M2M communication with the landing target vehicle 300 designated by the control center 100 based on the received M2M communication information.

In a state in which the landing target vehicle 300 is identified, when the identified landing target vehicle 300 stops or moves at a speed less than a predetermined speed, the unmanned aerial vehicle 200 may land on the roof of the landing target vehicle 300. The unmanned aerial vehicle 200 may check the stop information by receiving the stop information of the identified landing target vehicle 300, e.g., the intersection stop time, from the control center 100 or the unmanned aerial vehicle 200 may check the stop information by calculating the stop information from the information acquired by the sensor 210. When landing, the unmanned aerial vehicle 200 may determine a flat position in the location, e.g., the roof of the landing target vehicle 300, and then land thereon.

When the unmanned aerial vehicle 200 lands on the landing target vehicle 300, the unmanned aerial vehicle 200 may move by riding on the vehicle 300 (440). During the unmanned aerial vehicle 200 moves by riding on the vehicle 300, the unmanned aerial vehicle 200 may determine a take-off position by re-searching a driving route in real time (450), and then fly by taking off at a determined take off position (460).

Until the unmanned aerial vehicle 200 reaches the take-off position, from when the unmanned aerial vehicle 200 lands on the landing object, the unmanned aerial vehicle 200 may move by riding on the vehicle 300. While the unmanned aerial vehicle 200 lands on the vehicle 300 and move together with the vehicle 300, the unmanned aerial vehicle 200 may search the driving route in real time and then determine a take-off position of the vehicle 300. For example, when the vehicle 300 deviates from the driving route, the unmanned aerial vehicle 200 may take off from the vehicle 300. When the unmanned aerial vehicle 200 takes off from the vehicle 300, the unmanned aerial vehicle 200 may move by flying along the searched driving route.

In other forms of the present disclosure, the unmanned aerial vehicle 200 may determine a pre-registered vehicle 300 as the landing target vehicle 300. Referring to FIG. 5, the unmanned aerial vehicle 200 may search vehicles placed around the driving route (500), and identify a vehicle having a disclosed driving route, among the searched vehicles (510). The unmanned aerial vehicle 200 may determine a vehicle that moves in a route corresponding to at least one part of the driving route of the unmanned aerial vehicle 200, among the identified vehicle (520), move to the determined vehicle 300 (530) and land thereon (540).

The unmanned aerial vehicle 200 may land on the pre-registered vehicle 300 instead of the vehicle designated by the control center 100. The pre-registered vehicle 300 may include public transportation having a disclosed driving route, e.g., bus. The unmanned aerial vehicle 200 may check whether a pre-registered vehicle is around by searching vehicles around the route, while moving along the driving route.

When a pre-registered vehicle in driving around the driving route is identified, the unmanned aerial vehicle 200 may determine the registered vehicle that moves in the same route as or similar route with the driving route of the unmanned aerial vehicle 200, among the identified registered vehicles, as the landing target vehicle 300.

In a state in which the registered vehicle 300, i.e., a landing target, is determined, when the determined-registered vehicle 300 stops or moves at a speed less than a predetermined speed, the unmanned aerial vehicle 200 may land on the roof of the registered vehicle 300. The unmanned aerial vehicle 200 may check the stop information of the determined-registered vehicle 300, e.g., an average stop time or an intersection stop time, by receiving the stop information from the control center 100, or check the stop information by calculating the stop information from the information acquired by the sensor 210. When landing, the unmanned aerial vehicle 200 may determine a flat position in the location, e.g., the roof of the landing target vehicle 300, and then land thereon.

When landing on the determined-registered vehicle 300, the unmanned aerial vehicle 200 may move by riding on the vehicle 300 (550). While the unmanned aerial vehicle 200 moves by riding on the vehicle 300, the unmanned aerial vehicle 200 may determine a take-off position by re-searching the driving route in real time (560), and fly by taking off at a determined take off position (570).

When the unmanned aerial vehicle 200 lands on the determined-registered vehicle 300, the unmanned aerial vehicle 200 may move by riding on the vehicle 300 until the unmanned aerial vehicle 200 reaches the take-off position. While the unmanned aerial vehicle 200 lands on the vehicle 300 and moves together with the vehicle 300, the unmanned aerial vehicle 200 may search the driving route in real time and then determine a take-off position of the vehicle 300. For example, when the vehicle 300 deviates from the driving route, the unmanned aerial vehicle 200 may take off from the vehicle 300. When the unmanned aerial vehicle 200 takes off from the vehicle 300, the unmanned aerial vehicle 200 may move along the searched driving route by flying.

In other forms of the present disclosure, the unmanned aerial vehicle 200 may land on any vehicle 300 instead of the vehicle designated by the control center 100 or the pre-registered vehicle. Referring to FIG. 6, the unmanned aerial vehicle 200 may determine a landing position (600), and search vehicles placed around the determined position (610). The unmanned aerial vehicle 200 may determine a vehicle that moves in a route corresponding to at least one part of the driving route of the unmanned aerial vehicle 200, among the identified vehicle (620), and land on the determined vehicle 300 (630).

The unmanned aerial vehicle 200 may search and determine a landing position allowing the movement by riding on the vehicle, in the surroundings of the driving route, move to the determined position and search adjacent vehicles. The unmanned aerial vehicle 200 may determine a position, e.g., the intersection or the toll gate, in which the vehicle can be stopped periodically, as a landing position. When the landing position of the unmanned aerial vehicle 200 is determined, the unmanned aerial vehicle 200 may move to the determined landing position, search a vehicle in the surrounding, and determine a vehicle that moves in the same route as or similar route with the driving route of the unmanned aerial vehicle 200. For example, when the driving route of the unmanned aerial vehicle 200 is along the around the road, the unmanned aerial vehicle 200 may determine a vehicle driving around the road, as the landing target vehicle 300.

When the unmanned aerial vehicle 200 determines the landing target vehicle 300, the unmanned aerial vehicle 200 may preferentially determine a vehicle 300 having a high height and a flat roof, as the landing target vehicle 300. A vehicle having a relatively uneven roof, which is not appropriate for the 200 to lane thereon, e.g., a taxi or a truck having loads, may be excluded.

When the unmanned aerial vehicle 200 lands on the determined vehicle 300 (630), the unmanned aerial vehicle 200 may move by riding on the vehicle 300 (640). While the unmanned aerial vehicle 200 moves by riding on the vehicle 300, the unmanned aerial vehicle 200 may determine a take-off position by re-searching a driving route in real time (650), and fly by taking off at a determined take off position (660).

When the unmanned aerial vehicle 200 lands on the determined vehicle 300, the unmanned aerial vehicle 200 may move by riding on the vehicle 300 until the unmanned aerial vehicle 200 reaches the take-off position. While the unmanned aerial vehicle 200 lands on the vehicle 300 and moves together with the vehicle 300, the unmanned aerial vehicle 200 may search the driving route in real time and then determine a take-off position of the vehicle 300. For example, when the vehicle 300 deviates from the driving route, the unmanned aerial vehicle 200 may take off from the vehicle 300. When the unmanned aerial vehicle 200 takes off from the vehicle 300, the unmanned aerial vehicle 200 may move along the searched driving route by flying.

Figure 7:
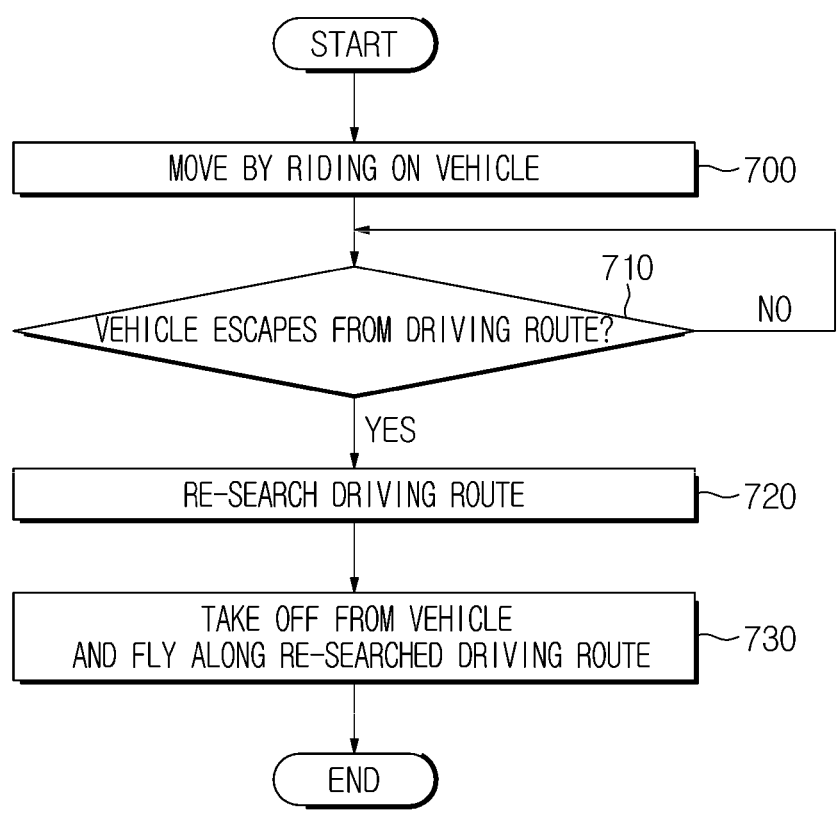

The unmanned aerial vehicle 200 may move by riding on the vehicle 300 and then fly after taking off from the vehicle 300. Referring to FIG. 7, during the unmanned aerial vehicle 200 moves by riding on the vehicle 300 (700), when the vehicle 300 deviates from the driving route (710), the unmanned aerial vehicle 200 may re-search a driving route (720), and then fly along the searched driving route after taking off from the vehicle 300 (730).

During the unmanned aerial vehicle 200 moves by riding on the vehicle 300, the unmanned aerial vehicle 200 may periodically check whether the vehicle 300 deviates from the driving route or not. When the vehicle 300 moves along the driving route, the unmanned aerial vehicle 200 may maintain moving by riding on the vehicle 300 but when the vehicle 300 deviates from the driving route, the unmanned aerial vehicle 200 may search a new flight route to reach the destination.

The new flight route may be determined by the unmanned aerial vehicle 200 by itself based on the map information stored in the storage 240 and the road information, or received from the control center 100. When the new flight route re-searched, the unmanned aerial vehicle 200 may take off from the vehicle 300 and start flying along the re-searched flight route. Other than when the vehicle 300 deviates from the driving route, when a remaining distance or time to the destination is equal to or less than a predetermined distance or time, or when the unmanned aerial vehicle 200 enters an area in which the movement by riding on the vehicle is not allowed, the unmanned aerial vehicle 200 may take off from the vehicle 300 and fly along the re-searched flight route.

Figure 8:
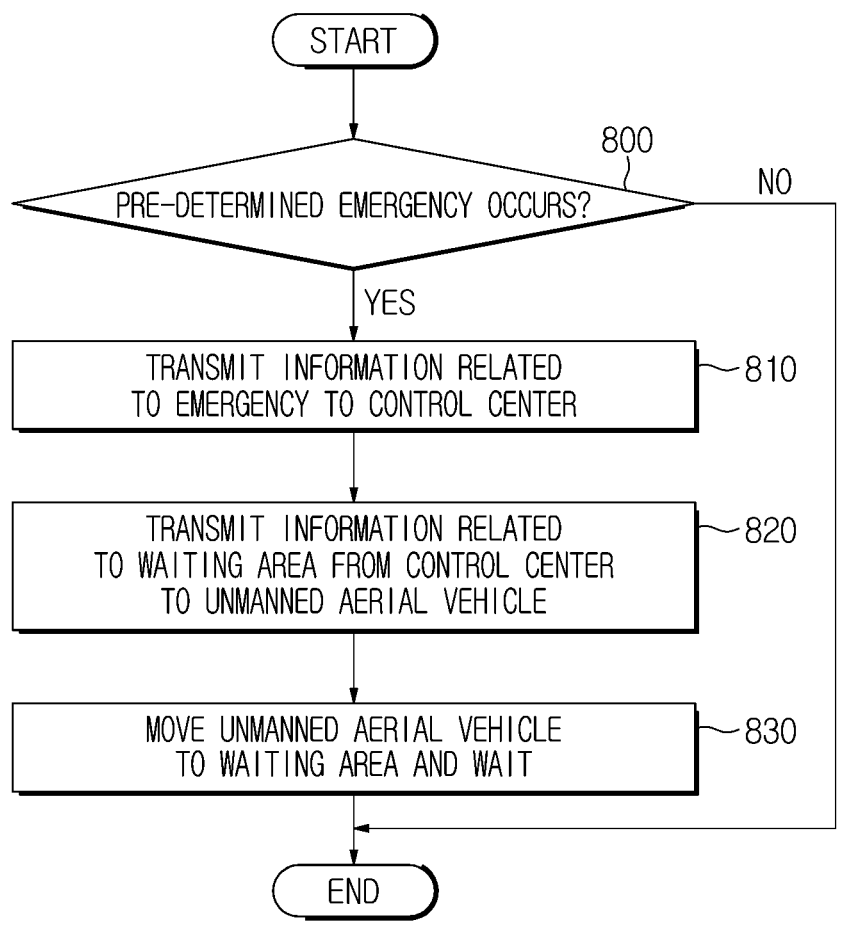

When a predetermined emergency occurs, the unmanned aerial vehicle 200 may correspond to the emergency according to a pre-determined manual via the communication with the control center 100. Referring to FIG. 8, when the predetermined emergency occurs (800), the unmanned aerial vehicle 200 may transmit information related to the emergency to the control center 100 (810). When receiving the information related to the emergency, the control center 100 may transmit information related to a waiting area to which the unmanned aerial vehicle 200 moves and then waits, to the unmanned aerial vehicle 200 (820) and then the unmanned aerial vehicle 200 may move to the waiting area and wait (830).

When the emergency occurs (e.g., when an accident occurs during the unmanned aerial vehicle 200 flies or moves by riding on the vehicle, when an accident occurs during the unmanned aerial vehicle 200 takes off or lands on the vehicle 300, when the unmanned aerial vehicle 200 fails to fly due to the bad weather, when it is not easy for the unmanned aerial vehicle 200 to move to the destination due to the battery consumption, when a technical problem occurs in the unmanned aerial vehicle 200, or when the during the unmanned aerial vehicle 200 delivers a certain goods and the goods are damaged in transit), the unmanned aerial vehicle 200 may transmit the information related to the emergency to the control center 100.

When receiving the information related to the emergency, the control center 100 may search a waiting area for the unmanned aerial vehicle 200, around the position of the unmanned aerial vehicle 200. The waiting area may be a predetermined place or a place that is not predetermined but determined as a place appropriate for the unmanned aerial vehicle 200 to be waited. When the waiting area is determined, the control center 100 may transmit information related to the waiting area to the unmanned aerial vehicle 200. The information related to the waiting area may include position information of the waiting area.

When receiving the information related to the waiting area, the unmanned aerial vehicle 200 may move to the waiting area and then wait. While the unmanned aerial vehicle 200 waits in the waiting area, the unmanned aerial vehicle 200 may periodically transmit information related to the position and the conditions to the control center 100.

When a severe damage occurs in the unmanned aerial vehicle 200 such that the flight is impossible, the unmanned aerial vehicle 200 may transmit SOS signal to the control center 100. When receiving the SOS signal, the control center 100 may send a rescue unmanned aerial vehicle to the position of the unmanned aerial vehicle 200 and move the unmanned aerial vehicle 200 to a predetermined location allowing the problems generated in the unmanned aerial vehicle 200 to be solved.

As is apparent from the above description, according to the proposed unmanned aerial vehicle and a system having the same, it may be possible to increase a moving distance of the unmanned aerial vehicle.

In some forms of the present disclosure, it may be possible to increase the battery life of the unmanned aerial vehicle.

In addition, in other forms of the present disclosure, it may be possible to safely move in a flight restricted zone or an urban area with many skyscrapers.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system comprising:
a controller configured to:
monitor a movement of an unmanned aerial vehicle through a communication with the unmanned aerial vehicle; and
transmit a destination and at least one flight route to reach the destination to the unmanned aerial vehicle; and
the unmanned aerial vehicle configured to:
transmit and receive information regarding a movement including the flight route through the communication with the controller;
land on a vehicle moving in a route corresponding to a driving route of a plurality of driving routes of the unmanned aerial vehicle;

move together with the vehicle; and
when the unmanned aerial vehicle lands on the vehicle and moves with the vehicle, re-search a driving route periodically.

2. The system of claim 1, wherein the controller is configured to:
determine a vehicle for the unmanned aerial vehicle to land on based on a driving route of the unmanned aerial vehicle; and
transmit identification information of the vehicle to the unmanned aerial vehicle.

3. The system of claim 1, wherein the unmanned aerial vehicle is configured to:
identify a vehicle, wherein the controller determines the vehicle as a landing target vehicle; and
land on the vehicle.

4. The system of claim 1, wherein the unmanned aerial vehicle is configured to:
search vehicles located around the driving route of the unmanned aerial vehicle;
identify a vehicle having a disclosed driving route; and
land on a vehicle moving in a route corresponding to the driving route of the plurality of the driving routes of the unmanned aerial vehicle among the vehicles having the disclosed driving route.

5. The system of claim 1, wherein the unmanned aerial vehicle is configured to:
determine a landing position; and
land on a vehicle moving in a route corresponding to the driving route of the plurality of driving routes of the unmanned aerial vehicle among vehicles located around the landing position.

6. The system of claim 1, wherein
when a remaining distance to a destination is equal to or less than a predetermined distance, the unmanned aerial vehicle is configured to take off from the vehicle.

7. The system of claim 1, wherein the unmanned aerial vehicle is configured to:
when the vehicle deviates from the driving route, take off from the vehicle.

8. The system of claim 1, wherein the controller is configured to:
when the unmanned aerial vehicle lands on the vehicle and moves together with the vehicle, periodically monitor whether the vehicle deviates from the driving route; and
when the vehicle deviates from the driving route, re-search a driving route of the unmanned aerial vehicle and transmit the driving route of the unmanned aerial vehicle to the unmanned aerial vehicle.

9. The system of claim 1, wherein the controller is configured to transmit flight information to the unmanned aerial vehicle, wherein the flight information comprises coordinates of the destination, and GPS coordinates and altitude information generated at every predetermined distance.

10. The system of claim 1, wherein
when a predetermined condition occurs, the unmanned aerial vehicle is configured to transmit information regarding the condition to the controller; and
when receiving information regarding a waiting area from the controller, the unmanned aerial vehicle is configured to move to the waiting area and wait.

11. The system of claim 1, wherein when receiving information regarding the predetermined condition from the unmanned aerial vehicle, the controller is configured to:
search a waiting area, wherein the unmanned aerial vehicle is configured to move to the waiting area;
transmit the information regarding the waiting area to the unmanned aerial vehicle; and
send a rescue unmanned aerial vehicle to the waiting area.

12. An unmanned aerial vehicle comprising:
a sensor configured to acquire information regarding the surroundings;
a communicator configured to communicate with a control center; and
a controller configured to:
allow the unmanned aerial vehicle to land on a vehicle moving in a route corresponding to a driving route of a plurality of driving routes based on information acquired by the sensor and received via the communicator; and
re-search a driving route periodically when the unmanned aerial vehicle lands on the vehicle and moves with the vehicle.

13. The unmanned aerial vehicle of claim 12, wherein when the communicator receives identification information of a landing target vehicle that is transmitted from the control center, the controller is configured to identify the landing target vehicle based on the information acquired by the sensor, and to allow the unmanned aerial vehicle to land on the landing target vehicle.

14. The unmanned aerial vehicle of claim 12, wherein the controller is configured to:
identify a vehicle having a disclosed driving route among vehicles located around the driving route of the unmanned aerial vehicle based on the information acquired by the sensor; and
allow the unmanned aerial vehicle to land on a vehicle moving in a route corresponding to the driving route of the plurality of the driving routes of the unmanned aerial vehicle among the vehicles having the disclosed driving route.

15. The unmanned aerial vehicle of claim 12, wherein the controller is configured to determine a landing position and allow the unmanned aerial vehicle to land on a vehicle moving in a route corresponding to the driving route of the plurality of driving routes of the unmanned aerial vehicle among vehicles located around the landing position.

16. The unmanned aerial vehicle of claim 12, wherein when a remaining distance to a destination is equal to or less than a predetermined distance, the controller is configured to allow the unmanned aerial vehicle to take off from the vehicle.

17. The unmanned aerial vehicle of claim 12, wherein:
when the vehicle deviates from the driving route, the controller is configured to allow the unmanned aerial vehicle to take off from the vehicle.

18. The unmanned aerial vehicle of claim 12, wherein
when a predetermined condition occurs, the controller is configured to transmit information regarding the condition to the control center; and
when receiving information regarding a waiting area, the controller is configured to move the unmanned aerial vehicle to the waiting area, wherein the unmanned aerial vehicle waits at the waiting area.

* * * * *